UNITED STATES PATENT OFFICE.

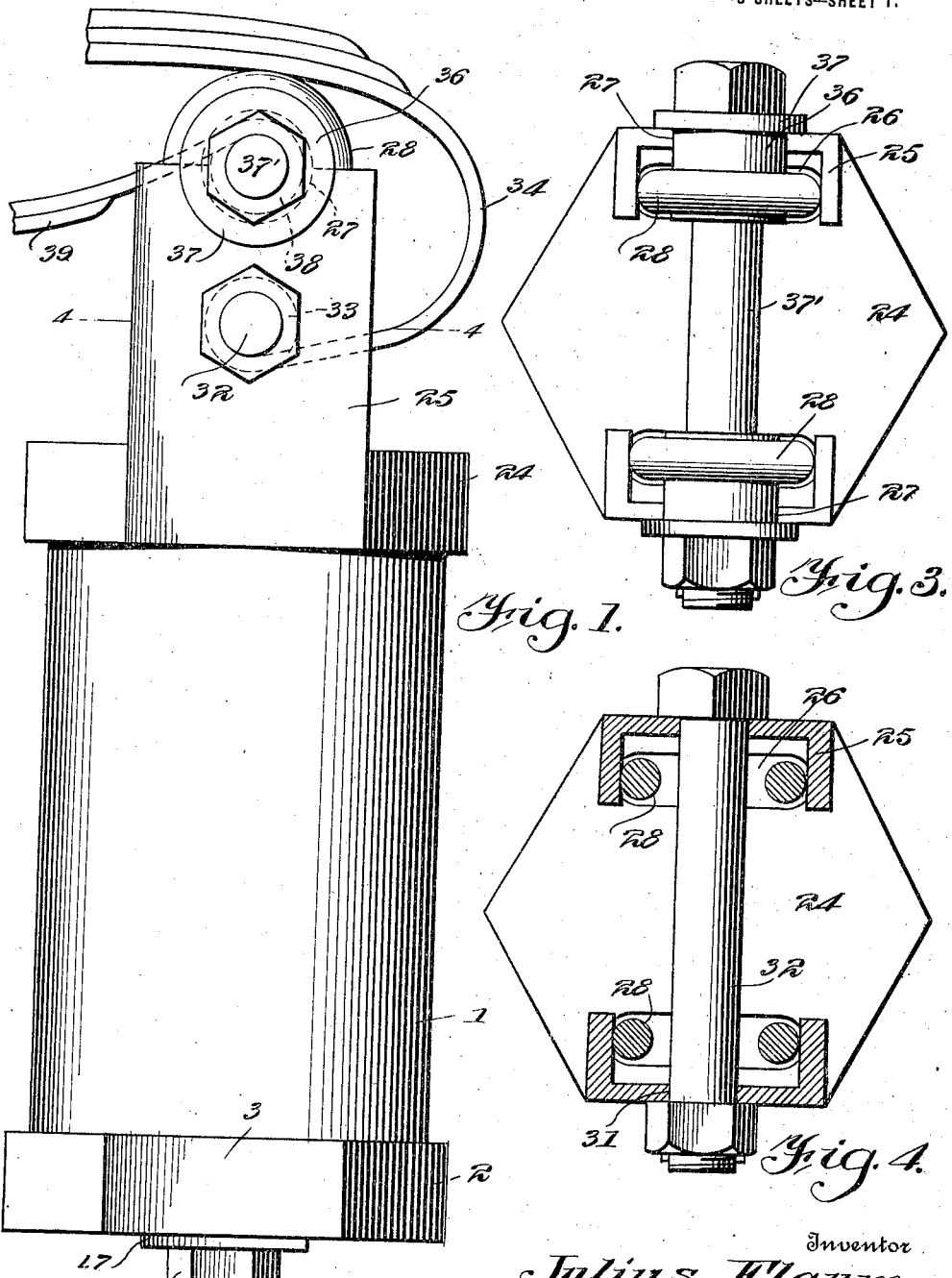

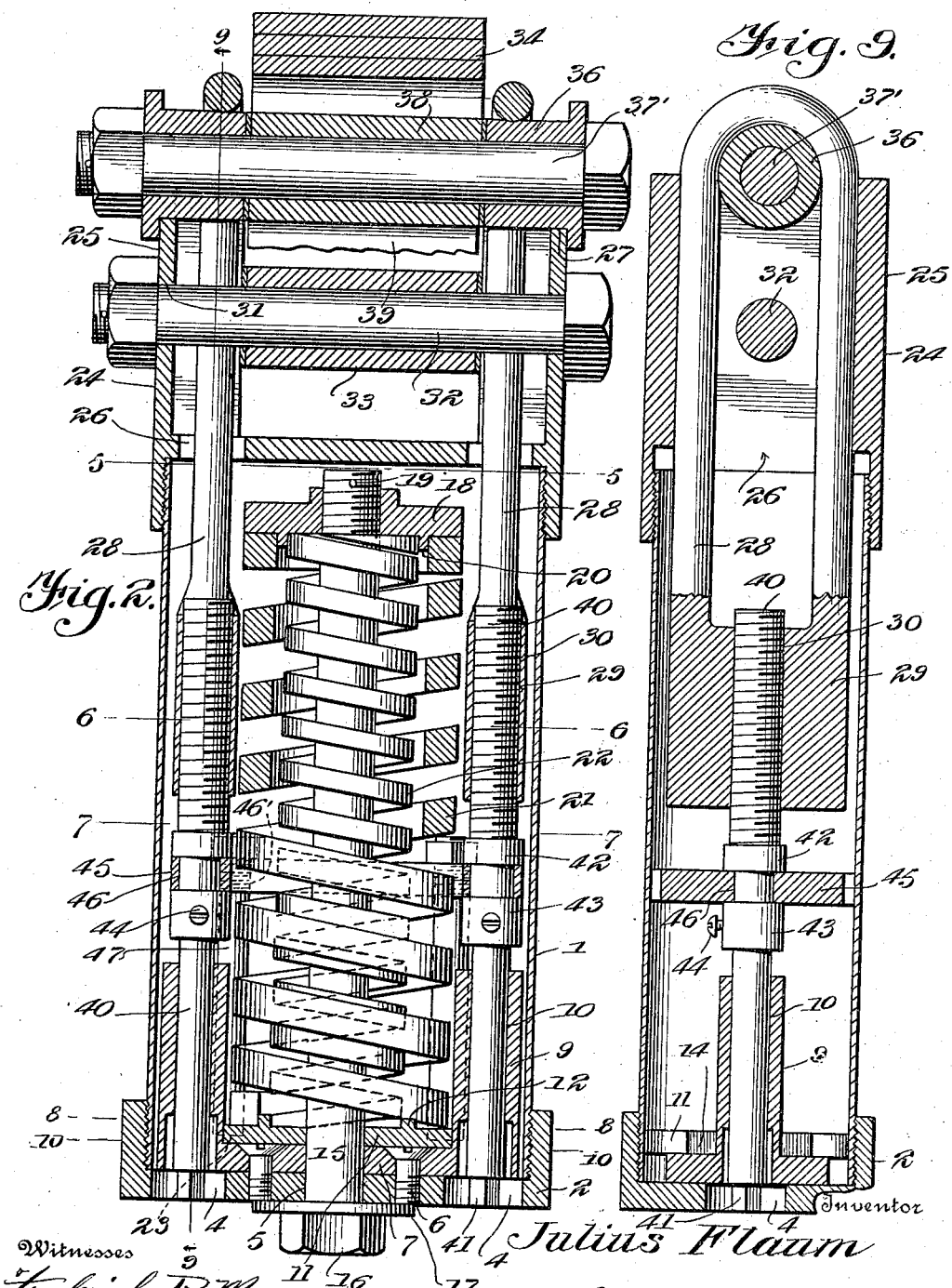

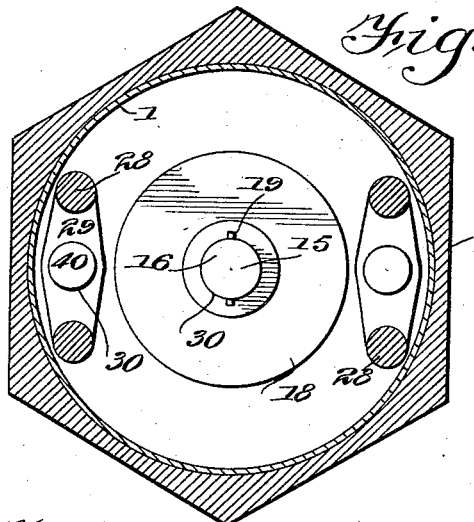

JULIUS FLAUM, OF NEW YORK, N. Y., ASSIGNOR, BY MESNE ASSIGNMENTS, TO CHARLES WEILAND, INC., OF NEW YORK, N. Y., A CORPORATION OF NEW YORK.

SHOCK-ABSORBER.

1,178,846.           Specification of Letters Patent.           Patented Apr. 11, 1916.

Application filed February 9, 1915.   Serial No. 7,085.

*To all whom it may concern:*

Be it known that I, JULIUS FLAUM, a citizen of the United States, residing at New York, in the county of New York and State of New York, have invented new and useful Improvements in Shock-Absorbers, of which the following is a specification.

The present invention relates to shock absorbers for vehicle springs.

In carrying out my invention it is my purpose to provide a shock absorber for vehicles, such as automobiles, which will permit the springs to work naturally on the closing movement, but which will retard excessive expansion and which will likewise prevent the injurious rebound which jars the machine and the mechanism of the machine, and tends to break the springs and jolt the passengers in the vehicle, but which further shall offer no resistance to gentle spring action, as for instance, when the vehicle is traveling on smooth roads.

A still further object of the invention is to produce a shock absorber which may be readily attached to the springs of any ordinary motor vehicle and which may be adjusted to compensate for the different weights of vehicles or for the weight carried within the vehicle.

With the above and other objects in view, the improvement resides in the construction, combination and arrangement of parts set forth in the following specification and falling within the scope of the appended claims.

In the drawings: Figure 1 is an elevation of a shock absorber constructed in accordance with the present invention, Fig. 2 is a central longitudinal sectional view through the same, Fig. 3 is a top plan view of the same, Fig. 4 is a sectional view approximately on the line 4—4 of Fig. 1, Fig. 5 is a similar sectional view on the line 5—5 of Fig. 2, Fig. 6 is a similar sectional view on the line 6—6 of Fig. 2, Fig. 7 is a similar sectional view on the line 7—7 of Fig. 2, Fig. 8 is a similar sectional view on the line 8—8 of Fig. 2, Fig. 9 is a vertical sectional view on the line 9—9 of Fig. 2, Fig. 10 is a horizontal sectional view on the line 10—10 of Fig. 2, and Fig. 11 is a detail view of the key.

In the preferred embodiment of my improvement, as illustrated by the accompanying drawings, I employ a casing, preferably in the nature of a tubular member 1 which may have its outer periphery, adjacent its opposite open ends, threaded. Threadedly or otherwise secured to the lower end of the casing is a flanged cap 2, the same having an irregular perimeter providing a plurality of faces 3 so that a wrench may readily engage with the cap to arrange the same upon or to remove the same from the casing 1. The cap 2 upon its lower flat face, at diametrically opposite points, is provided with comparatively enlarged preferably annular openings 4, and is also centrally provided with an additional annular opening 5. Arranged upon the inner face of the cap 2, and removably secured thereto through the medium of screw or like elements 6 is a plate 7, the said plate having its diametrically opposite ends provided with upwardly projecting members or bosses 9, and the said bosses are provided with openings 10 which register with the openings 4, and preferably the openings are enlarged at the lower end of the base of the plate 7 as clearly illustrated in Fig. 2 of the drawings.

Seated upon the plate 7 is a spring supporting plate or disk 11, the said disk, at a suitable distance from its center being formed with a projecting annulus or ring 12 and the said disk, which has its periphery contacting with or slightly spaced from the bore of the casing 1 is provided with cut-away portions forming, what may be termed, guide slots 14 the walls of which embrace the inner side walls of the bosses 9.

Passing through the central opening 5, and through registering openings in the plate 7 and disk 11 is the shank 15 of a headed bolt 16, a washer 17 being arranged between the head of the bolt and the outer face of the cap 2. This bolt is of a length slightly less than that of the casing 1 and has only the outer end of its shank threaded. This threaded end passes through a central threaded opening provided in an upper spring engaging member or disk 18, and a pin 19 or analogous device passes transversely through the end of the bolt to prevent its removal from the disk 18. The disk 18 has its lower face, adjacent its periphery, provided with an annular flange or ring 20, and the said disk 18 is of a less cross sectional diameter than the lower disk 11. The numeral 21 designates a comparatively heavy spring which surrounds and contacts with the annular flanges or rings 12 and 20 respectively of the disks 11 and 18, while also surrounding the bolt 15 engaged by the disks 11 and 18 between their respective rings 12 and 20 is a helical spring 22 which is lighter than the spring 21. The disk 11, at a suitable distance between its periphery and its flange or ring 12 is provided with a plurality of threaded openings 23, the said openings being preferably arranged so that their inner walls are disposed in a plane parallel with the peripheral convolutions of the helical spring 21, and the purpose of the above arrangement will be hereinafter set forth in detail.

The numeral 24 designates the upper cap or closure for the casing 1, the said cap comprising a flange member having interior threads which engages with the threads upon the upper end of the said casing 1. The cap 24 has its outer perimeter formed with a plurality of angular faces to provide a wrench hold so that the said cap may be secured upon or removed from the casing when desired. The cap 24, at diametrically opposite points is provided with upwardly projecting channeled arms 25, and the said cap is further provided with elongated openings 26 which communicate with the channels that are provided upon the inner faces of the said arms 25, and the said openings are also disposed to aline or register with the openings in the bosses 9 and, of course, with the openings 4 in the lower cap 2. The upper or outer ends of the arms 25 between the side members thereof providing the channels for the same are formed with approximate semi-cylindrical depressions 27 forming bearings for journal members presently to be described.

The numerals 28 indicate a pair of hangers, these hangers comprising each a substantially yoke-shaped member, the outer connection between the spaced sides being round, and the lower connection between the spaced sides or arms being elongated as indicated by the numeral 29 and being preferably centrally thickened to provide for a longitudinally arranged threaded opening 30. One of the yokes or hangers 28 is received within one of the channeled arms 25 and passes through the opening 26 to arrange the elongated widened end 29 thereof within the casing 1 and to the opposite sides of the spring 21.

The arms 25 are provided with transverse alining openings 31 through which is passed a bolt or similar member 32, the said bolt being disposed between the arms of the yoke-shaped hangers and being secured to the arms of the cap 24 in any desired or preferred manner. This bolt has arranged or secured thereon the eye 33 provided upon the end leaf of the upper section of the usual elliptical carriage spring, the same being indicated by the numeral 34, while arranged within the semi-cylindrical bearing depressions 27, in the arms 25 are sleeves 36 provided with outer flanges 37 that normally contact with the outer faces of the arms 25 to the opposite sides of the said semi-cylindrical depressions 27. Passing through these sleeves 36 is a bolt or similar member 37' which is secured to the sleeves in any desired or preferred manner, and this bolt receives the eye 38 provided upon the end leaf of the lower section of the elliptical carriage spring 39. Thus it will be noted that one of the ends of the elliptical carriage spring has its upper and lower sections separated, and the purpose for this arrangement will also be presently understood.

Passing through the bore of each of the bosses 9 is a spring tension adjusting member in the nature of a bolt 40. Each of the members 40 has its lower end substantially rectangular, as at 41, the same being normally arranged within the openings 4 provided in the cap 2, and the said members have their upper ends threaded to engage with the threads provided in the walls of the openings 30. Each of the bolt members 40 at the terminal of its threaded portion is integrally formed with an annular flange 42, and each of the said members is further provided with an adjustable collar 43, the said collars being sustained upon the members 40 preferably through the medium of an adjustable or removable element, such as a screw 44. Arranged between the flange 42 and the collar 43 is a flat annular plate or disk 45, the same being provided with openings 46 whereby the disk is received upon the bolt, and this disk or plate is provided with a central opening so the same will not interfere with the springs 21 or 22. The disk or plate 45 is provided with a plurality of threaded openings 46' which are adapted to aline with the threaded openings 23, while the numerals 47 designate rod members having their opposite ends threaded to engage within the threaded openings 23 and 46 respectively.

When the bolts 40 are rotated so that their threaded ends will engage with the threaded openings in the lower connecting member of the yokes, the disk or plate 45 being connected with the lower disk 11 by the members 47 may be simultaneously raised or lowered within the casing to adjust the tension of the springs 20 and 21 as desired. When the tension of the said springs is to be adjusted without interfering with the hangers or with the bolt members connected with the hangers, the bolt 15 is turned to bring the upper disk either toward or away from the lower disk as desired, and from the above description, taken in connection with the drawings, it is believed that the operation and advantages of the

Having thus described the invention, what I claim is:

1. In a shock absorber, a casing, substantially bail-shaped hangers arranged and extending above the casing, oppositely arranged disks within the casing, springs exerting a tension upon the said disks, means for forcing the upper disk toward the lower disk to compress the springs between the disks, an adjusting screw for the hanger, a connection between the said screw and the lower disk, said screw adapted to force the lower disk toward the upper disk when the same is rotated in one direction, means for rigidly securing one end of a divided vehicle spring to the casing, and means for connecting the second end of the said spring with the hanger.

2. In a shock absorber, the combination with a vehicle spring having one of its ends separated, of a casing, cap members for the opposite ends of the casing, disk members within the casing, spring members exerting a tension and arranged between the said disk members, means comprising a bolt and engaging with the upper disk for forcing the same toward the lower disk to compress the spring members, channeled arms projecting from one of the cap members, yoke-shaped hangers arranged within the channels and extending to within the casing, said arms having their outer ends provided with semi-cylindrical depressions, a flanged sleeve within each of the depressions disposed between the arms of the hanger, a connecting member passing through the sleeves and hangers and adapted to engage with one of the ends of the vehicle spring, a bolt like member secured to the said arms and engaging with the second end of the vehicle spring, adjusting members having one of their ends threaded and engaging within threaded orifices in the hangers, a plate adjustably secured upon the said adjusting members, said plate having an opening through which the springs in the casing pass, and connecting members between the said plate and one of the bearing disks for the said springs.

In testimony whereof I affix my signature in presence of two witnesses.

JULIUS FLAUM.

Witnesses:
JAMES E. DUROSS,
DAVID J. SPRUNG.